United States Patent
Vlassarev et al.

(10) Patent No.: US 9,704,538 B2
(45) Date of Patent: Jul. 11, 2017

(54) ENVIRONMENTALLY CONTROLLING AN ENCLOSURE

(71) Applicant: SEAGATE TECHNOLOGY LLC, Cupertino, CA (US)

(72) Inventors: Dimitar Vlassarev, Northglenn, CO (US); Andrei Khurshudov, Niwot, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/928,156

(22) Filed: Oct. 30, 2015

(65) Prior Publication Data
US 2017/0125066 A1    May 4, 2017

(51) Int. Cl.
G11B 33/14    (2006.01)

(52) U.S. Cl.
CPC ................... G11B 33/144 (2013.01)

(58) Field of Classification Search
CPC ............................. G11B 33/14; G11B 33/144
USPC ................... 360/97.2, 97.22, 97.21; 340/626
See application file for complete search history.

(56) References Cited

U.S. PATENT DOCUMENTS

| | | | |
|---|---|---|---|
| 4,367,503 A | 1/1983 | Treseder | |
| 6,144,178 A * | 11/2000 | Hirano | G11B 33/1486 318/476 |
| 6,430,000 B1 | 8/2002 | Rent | |
| 6,646,821 B2 | 11/2003 | Bernett et al. | |
| 6,680,806 B2 | 1/2004 | Smith | |
| 6,683,747 B2 | 1/2004 | Bernett | |
| 6,785,089 B2 | 8/2004 | Bernett et al. | |
| 6,819,517 B2 | 11/2004 | Fioravanti et al. | |
| 6,898,043 B2 | 5/2005 | Fioravanti | |
| 7,218,473 B2 | 5/2007 | Bernett et al. | |
| 7,538,932 B2 | 5/2009 | Pan | |
| 7,555,947 B2 | 7/2009 | Kasajima | |
| 7,796,356 B1 | 9/2010 | Fowler et al. | |
| 7,800,858 B1 | 9/2010 | Bajikar et al. | |
| 7,908,526 B2 | 3/2011 | Guha | |
| 8,199,425 B1 | 6/2012 | Gustafson et al. | |
| 8,934,194 B2 | 1/2015 | Schreck | |
| 2006/0232891 A1* | 10/2006 | Bushnik | G01D 3/08 360/265.6 |
| 2011/0109989 A1 | 5/2011 | Turner et al. | |
| 2012/0098666 A1* | 4/2012 | Bavishi | F23K 5/007 340/626 |
| 2012/0176701 A1 | 7/2012 | Schreck | |

OTHER PUBLICATIONS

United States Statutory Invention Registration (SIR), Breather Vent Assembly Formed in a Sealed Disk Drive Housing, Reg. No. H1067, Published Jun. 2, 1992.

* cited by examiner

*Primary Examiner* — Allen T Cao
(74) *Attorney, Agent, or Firm* — Hall Estill Attorneys at Law (57) ABSTRACT

An apparatus and associated method contemplating a sealed container operably enclosing a storage device in an operating environment. A storage device controller is operably coupled to the storage device and configured to monitor operational parametric values of the storage device. An environment modifier is operably coupled to the container and configured to selectively alter the operating environment. A container controller is configured to selectively activate the environment modifier in response to parametric values from the storage device controller.

19 Claims, 10 Drawing Sheets

ENVIRONMENTALLY CONTROLLING AN ENCLOSURE

SUMMARY

Some embodiments of this technology contemplate an apparatus having a sealed container operably enclosing a storage device in an operating environment. A storage device controller is operably coupled to the storage device and configured to monitor an operational parametric value of the storage device. An environment modifier is operably coupled to the container and configured to selectively alter the operating environment. A container controller is configured to selectively activate the environment modifier in response to parametric values from the storage device controller.

Some embodiments of this technology contemplate an apparatus having a sealed container operably enclosing a storage device in an operating environment. An environment modifier is operably coupled to the container and configured to selectively alter the operating environment. A non-transitory, tangible computer readable storage medium has executable computer instructions defining environmental control logic that monitors operational parametric values of the storage device, compares the parametric values to one or more thresholds, and selectively activates the environment modifier based on the comparison.

Some embodiments of this technology contemplate a method including: obtaining an environment control device having a sealed container defining a cavity and an environment modifier configured to change an environment in the cavity; simultaneously operating a plurality of storage devices inside the container; monitoring parametric values of the storage devices; comparing the parametric values to one or more thresholds; and selectively activating the environment modifier based on the comparing step.

DETAILED DESCRIPTION

Initially, it is to be appreciated that this disclosure is by way of example only, not by limitation. The environmental control concepts herein are not limited to use or application with any specific device or in any specific method. Thus, although the instrumentalities described herein are for the convenience of explanation, shown and described with respect to exemplary embodiments of a hard disc drive, it will be appreciated that the principles herein may be applied equally in other types of systems and methods involving environmental control.

Many devices necessarily operate in a controlled environment, such as mechanical devices, electro-mechanical devices, electronic devices, and the like. Depending on the operation and type of device, operating environments can be controlled in various ways such as in relation to atmospheric composition, contamination, humidity, temperature, and pressure, to name a few.

One type of electro-mechanical device that can benefit from a controlled operating environment is a hard disc drive (HDD) data storage device. Although the presently claimed technology is described as controlling the operating environment for an HDD, the contemplated embodiments are not so limited. In alternative embodiments the claimed technology can control the operating environment for other devices such as a device containing solid state memory, like a solid state drive (SSD) data storage device. Devices other than data storage devices can likewise employ the claimed technology to control the operating environment.

Although the illustrative embodiments described below deal with controlling the composition of gas in an operating environment, the contemplated embodiments are not so limited. The skilled artisan having read this description readily ascertains how the technology can alternatively be used to control the operating environment in regard to other parametric values, such as but not limited to the temperature of the operating environment. Thermal control is important to keep electronics such as circuit boards and processors below a rated temperature during operation. In those alternative embodiments equipment is necessary to thermally alter the gas in the operating environment, instead of altering the amount of the gas as described in these illustrative embodiments. The skilled artisan needs no detailed explanation of how to cool gas instead of supplying gas in order to understand the scope of the claimed technology.

Figure 1:
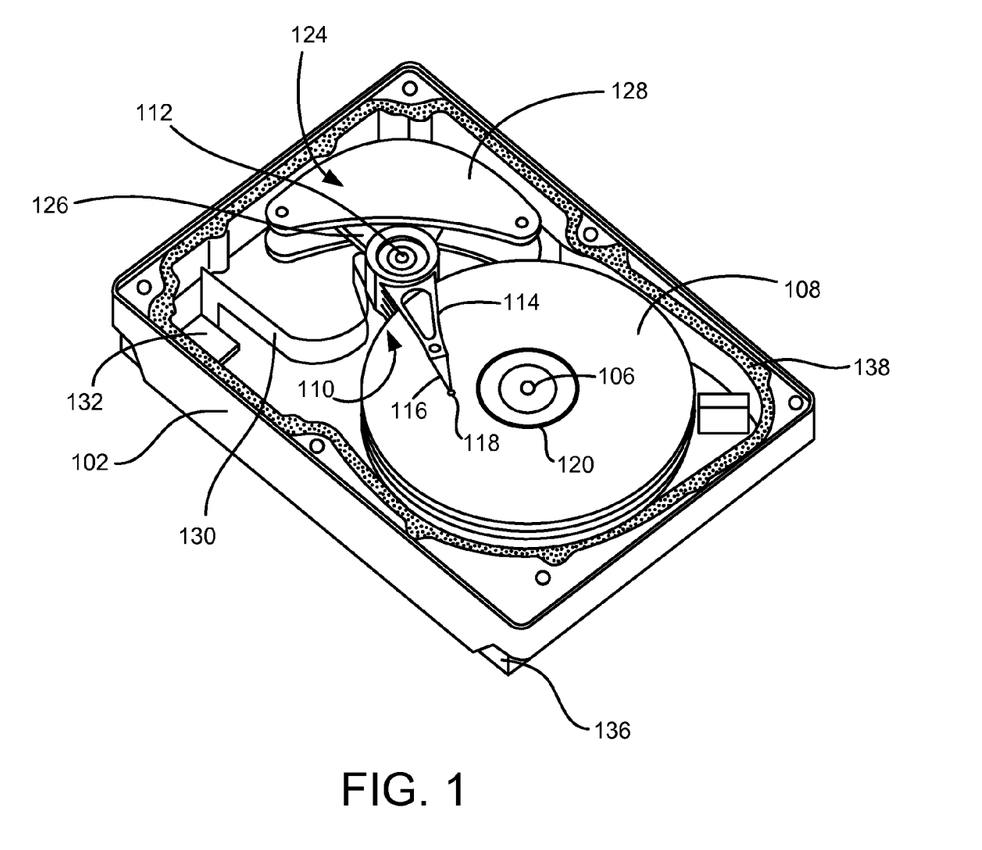
FIG. 1 is an isometric depiction of a hard disc drive employed in practicing the present technology.

FIG. 1 depicts an HDD 100 employed in practicing illustrative embodiments of the claimed technology. The HDD 100 has a base 102 to which various components of the HDD 100 are mounted. A structural cover (not depicted) is attached to the base 102 to form a housing that encloses the HDD components. The HDD components include a spindle motor 106 that rotates one or more discs 108 at a constant high speed. Information is written to and read from tracks on the discs 108 through the use of an actuator assembly 110 that rotates during a seek operation around a bearing shaft assembly 112 positioned adjacent the discs 108. The actuator assembly 110 includes a plurality of actuator arms 114 that extend toward the discs 108, with one or more flexures 116 extending from each of the actuator arms 114. Mounted at the distal end of each of the flexures 116 is a head 118, which includes a slider enabling the head 118 to fly in close proximity above the corresponding surface of the associated disc 108.

The track position of the heads 118 is controlled through the use of a voice coil motor 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over a park zone 120 near the inner diameter of the discs 108 when the drive motor is de-energized. The heads 118 are secured over the park zone 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board 136 mounted to the bottom side of the HDD 100.

Figure 2:
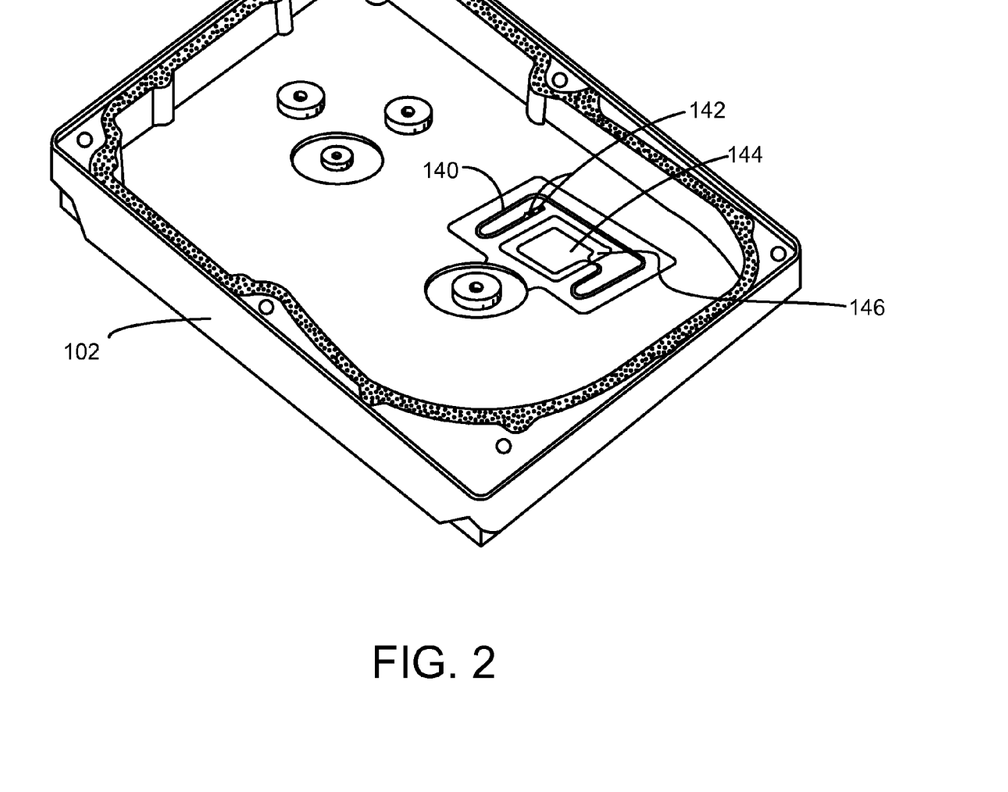
FIG. 2 is an isometric depiction of the base of the hard disc drive in FIG. 1 with components removed.

A sealing member 138 is compressed between the base 102 and the cover to seal the enclosed cavity from the environment surrounding the HDD 100. FIG. 2 depicts the base 102 with the components removed to reveal a tortuous diffusion path 140 that provides a passageway for fluid communication into and out of the enclosure formed by attaching the cover to the base 102. The diffusion path 140 does not extend through the base 102, and can be constructed such as by etching, molding, or cutting an indentation to a depth that is less than a material thickness of the base 102. The diffusion path 140 defines an enlarged opening at one end where one or more holes 142 extend through the base 102 to fluidly communicate with the external environment surrounding the HDD 100. The diffusion path 140 also defines an enlarged opening 144 at the other end in fluid communication with the internal environment of the enclosure. A recess 146 is sized to retain a filter above (as depicted) the opening 144. A cover (not depicted) such as a plate or an adhesive strip is placed over the entire diffusion path 140 to close all but the ends 142, 144.

Figure 3:
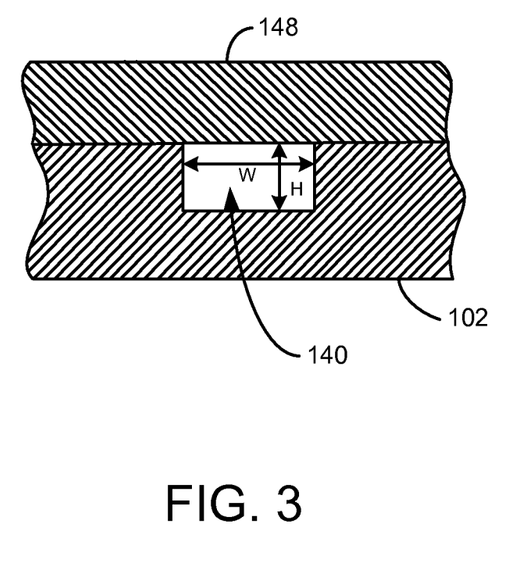
FIG. 3 is a cross-sectional depiction of the base in FIG. 2.

FIG. 3 is a cross-sectional view of a portion of the base 102 at a medial portion of the diffusion path 140. A cover 148 closes the diffusion path 140 so that fluid flows into and out of the HDD enclosure only along the tortuous route of the diffusion path 140. In these illustrative embodiments the diffusion path 140 is formed by a rectangular cavity in the base 102 defining a cross-sectional area (A) that is the product of the width (W) and the height (H). The length (L) of the diffusion path 140 is ascertainable as the total length from the openings 142 to the reservoir 144. The flow resistance (R) of the diffusion path as encountered by a fluid passing through it is in terms of the ratio of cross-sectional area (A) to length (L):

$$R = \frac{A}{L}$$

Figure 4:
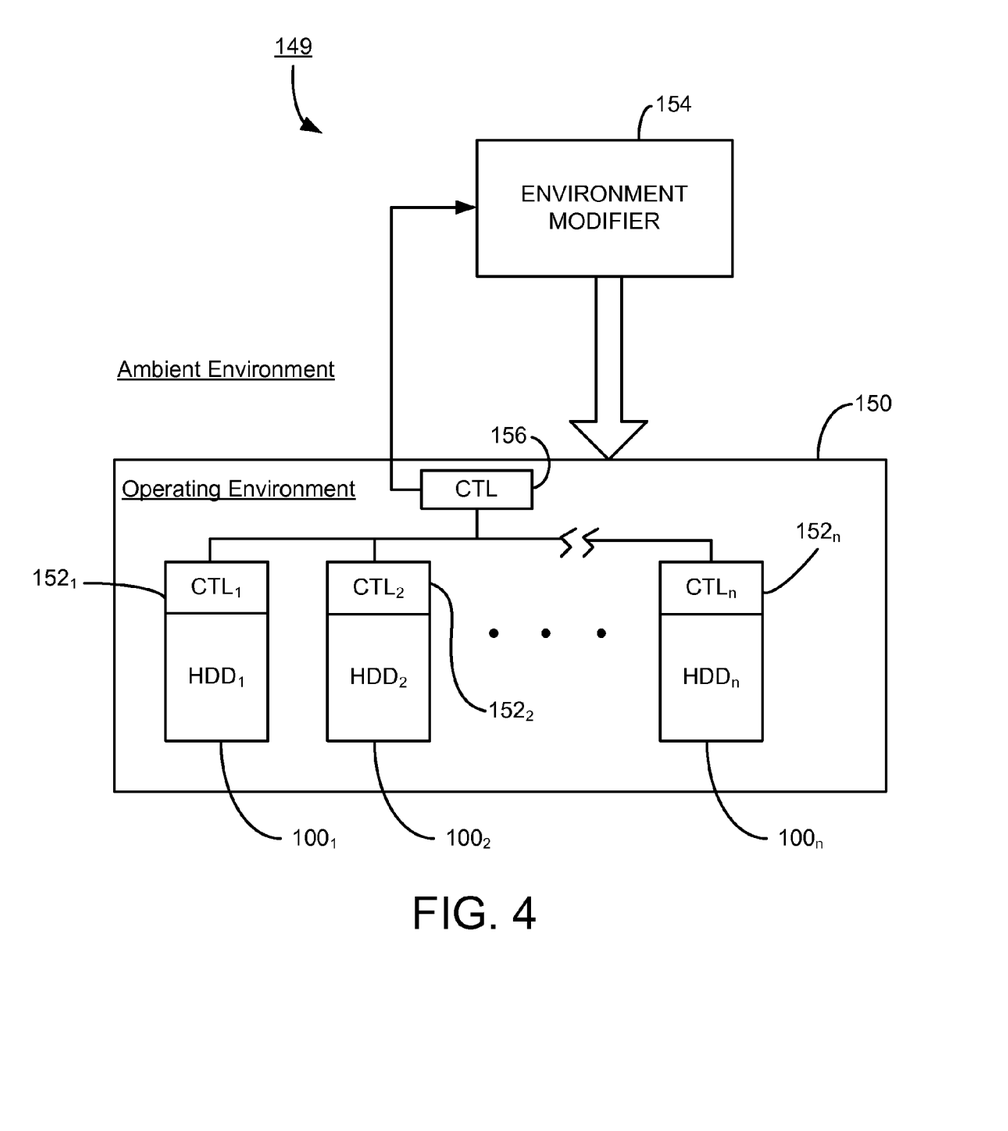
FIG. 4 is a diagrammatical depiction of an environmental control system constructed in accordance with this technology.

FIG. 4 diagrammatically depicts a data storage system 149 that is constructed in accordance with embodiments of this technology. In that system 149 a plurality of the HDDs $100_1, 100_2, \ldots 100_n$ are contained within a sealed container 150. The container 150 isolates the HDDs 100 from the surrounding ambient environment, so they operate within a controlled operating environment.

The operating environment can be controlled with regard to a number of different factors, such as temperature, humidity, pressure, and the like. For purposes of this illustrative description the operating environment is controlled according to the gas composition. In order to improve HDD 100 operation, a selected concentration of an inert gas (such as helium) instead of air is contained in the operating environment.

By way of the respective diffusion path 140, each HDD 100 is filled with the helium in the operating environment. Filling HDDs 100 with a low-density gas other than air (such as helium in this illustrative example) enhances HDD 100 performance. For example, helium (or another low density gas) can reduce the aerodynamic drag experienced by the spinning discs 108 within the HDD 100, thereby reducing the power requirements for the spindle motor 106. A helium filled HDD 100 thus uses significantly less power than a comparable HDD that operates in an air environment. Additionally, the reduction in drag forces within the helium filled HDD 100 also reduces the amount of aerodynamic turbulence that is experienced by the drive components such as the actuator arms 114, the suspensions 116 and the heads 118. These reductions in spindle motor power and "air" turbulence allow HDDs 100 filled with low density gas to be operated at higher speeds than conventional air filled HDDs while maintaining the same performance (e.g., the same percentage of read/write errors). Additionally, helium filled HDDs 100 may allow for higher storage capacities (i.e., higher recording densities) due to the fact that there is less turbulence within the HDD 100 and the heads 118 may fly more closely to the surface of the disc 108.

Staying with FIG. 4, a storage device controller 152 is coupled to each HDD 100. In FIG. 4 each storage device controller 152 is depicted as being integral to the respective HDD 100. For example, the storage device controller 152 can reside on the printed circuit board 136 (FIG. 1) of the respective HDD 100. Alternatively, the storage device controller 152 can be a separate component apart from its respective HDD 100. Furthermore, FIG. 4 depicts the storage device controllers 152 residing in the operating environment inside the container 150, although the contemplated embodiments are not so limited. In alternative embodiments not depicted the storage device controllers 152 can reside outside the container 150, either locally to or remotely from the container 150.

The storage device controllers 152 are configured to monitor a selected operational parameter (parametric value) of the respective HDD 100. In this illustrative example the objective is to operate the HDDs 100 in an inert gas environment of a predetermined concentration. A correlation can be empirically established between the inert gas concentration in the container 150 and an HDD 100 parametric value. For example, because, the inert gas environment reduces the load on the spindle motor 106 (FIG. 1), the inert gas concentration can be measured in relation to the amperage drawn by the spindle motor 106. As the inert gas composition in the operating environment increases the motor amperage decreases. An inverse correlation can be empirically derived for purposes of using the motor amperage of the HDD 100 parametric value for purposes of monitoring helium concentration in accordance with this technology. Other parametric values could be used for this purpose instead of motor amperage, such as head fly height, bit error rate, and the like.

Staying with FIG. 4, the system 149 also has an environment modifier 154 that is coupled to the container 150 and configured to alter the operating environment inside the container 150. In the present illustrative example of maintaining a desired inert gas concentration in the container 150, the environment modifier 154 can be a replenishment source of the inert gas. The replenishment can be provided such as by a pressurized vessel with controls to selectively transfer gas from the vessel to the container 150, a container of gas and a pumping mechanism to make that transfer, and the like.

The system 149 also has a container controller 156 that is configured to selectively activate the environment modifier 154 in response to the HDD 100 parametric values. For example, in this illustrative example the container controller 156 can receive parametric signals that indicate the motor amperage from each of the storage device controllers 152. Generally, if the container controller 156 determines that the parametric signals indicate the inert gas concentration in the operating environment is too low, then the container controller 156 responds by activating the environment modifier 154 to admit more inert gas into the container 150.

Figure 5:
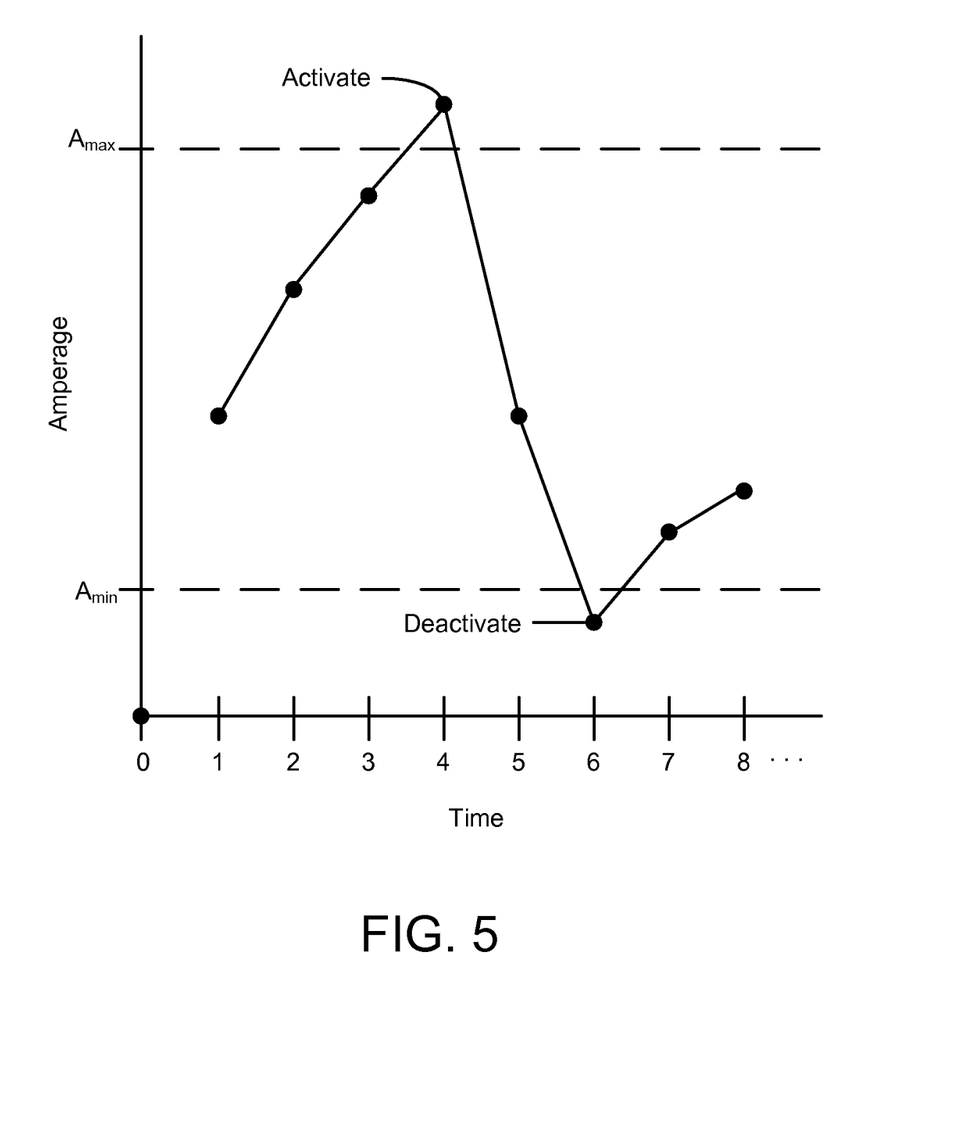
FIG. 5 graphically depicts environmental control by this technology.

FIG. 5 graphically depicts the result of the container controller 156 being programmed to compare parametric values to a predetermined threshold in selectively activating the environment modifier 154. For this illustrative example the container controller 156 reads the motor amperage value at each of a selected number of intervals. The intervals can be minutes, hours, days, months, or whatever interval is deemed necessary to adequately control the gas concentration in the container 150.

The graph indicates that during intervals 1-3 there is a steady rise in motor amperage, indicating that the inert gas concentration in the container is decreasing. The container controller 156 is programmed to compare each parametric value to the maximum allowable amperage threshold, $A_{max}$. At time interval 4 the parametric value exceeds the predetermined threshold, and in response the container controller 156 is programmed to activate the environment modifier 154 to admit more inert gas into the container 150, thereby increasing the inert gas concentration in the container 150. Further parametric values eventually indicate that the motor amperage is less than a minimum amperage threshold, $A_{min}$. The container controller 156 is programmed to respond to the sub-threshold reading at time interval 6 by deactivating the environment modifier 154.

In alternative embodiments the container controller 156 can be programmed to activate the environment modifier 154 for a predetermined time after activation occurs, instead of defining the minimum threshold value $A_{min}$ and then comparing subsequent parametric values to the $A_{min}$.

Figure 6:
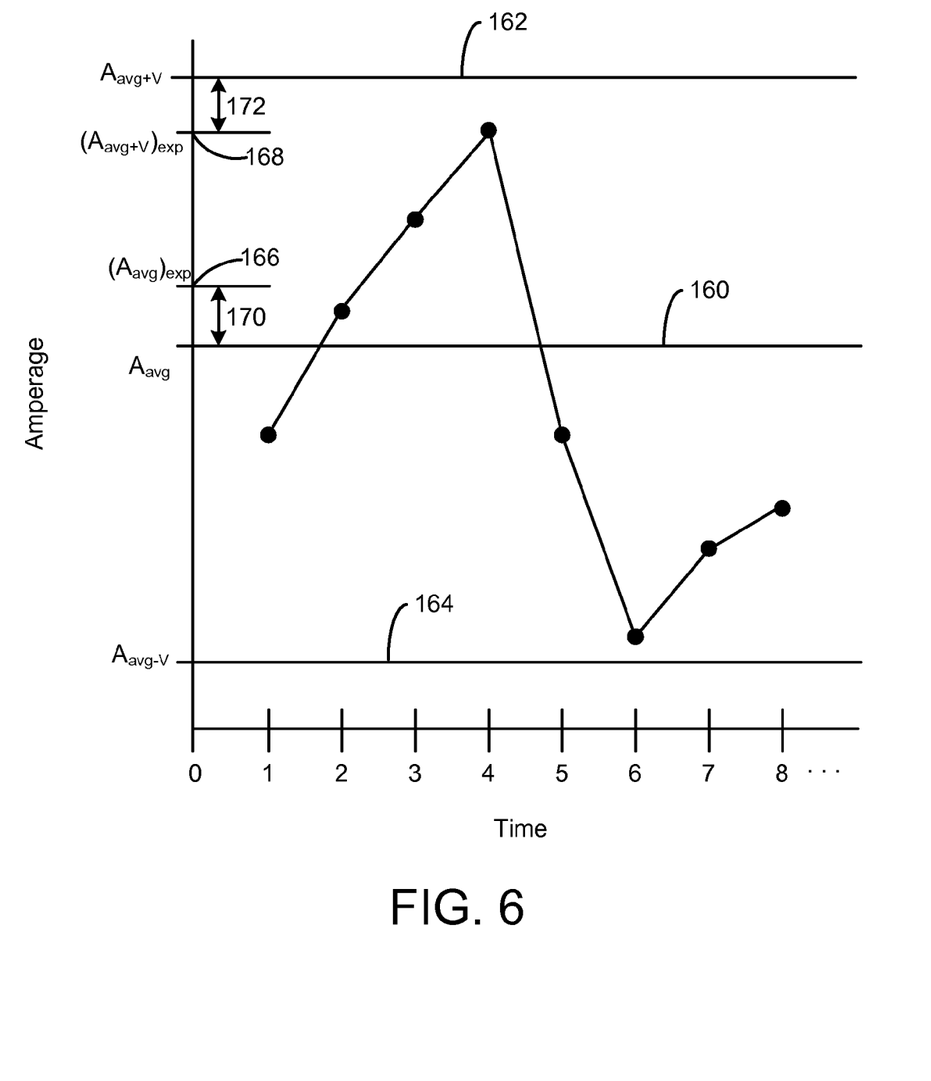
FIG. 6 graphically depicts environmental control by an alternative embodiment of this technology.

FIG. 6 graphically depicts the result of the container controller 156 being programmed to statistically calculate the mean $A_{avg}$ 160 and the variance $V_+$ 162, $V_-$ 164 of previous parametric values from the storage device controller 152:

$$A_{avg} = \frac{\sum_i^n A_n}{n}$$

The variance can be calculated as follows:

$$V = \sqrt{\frac{1}{n-1}\sum_1^n (A_n - A_{avg})^2}$$

In these illustrative embodiments, instead of continually comparing the parametric values to predetermined $A_{max}$ and $A_{min}$ thresholds, the container controller 156 calculates the statistical variation of previous parametric values. The container controller 156 can compare the observed mean for time intervals 1-8 to a statistically derived expected mean $(A_{avg})_{exp}$ 166, and likewise compares the variance for time intervals 1-8 to a previously established expected variance $(A_{avg}+V)_{exp}$ 168. The illustrative example of FIG. 6 depicts the observed average is less than the expected average by a margin 170. The margin 170 can be compared to a predetermined threshold for responsively activating or deactivating the environment modifier 154. Likewise, the illustrative example of FIG. 6 depicts the observed variance is greater than the expected variance by another margin 172. Similarly, the margin 172 can be compared to another predetermined threshold for responsively activating or deactivating the environment modifier 154.

Figure 7:
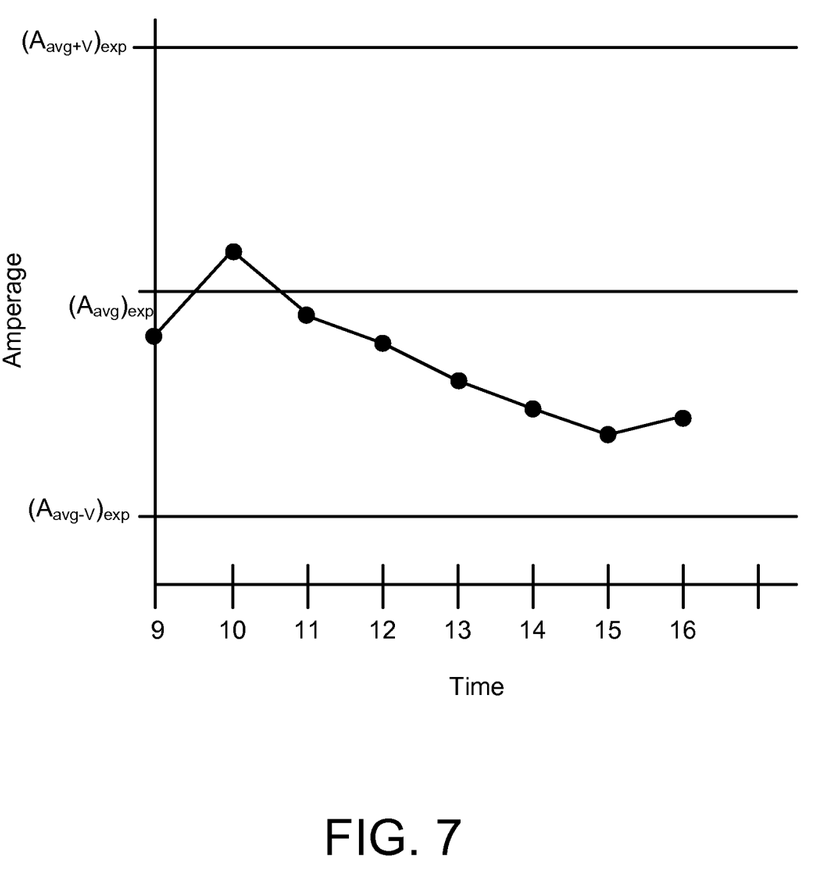
FIG. 7 graphically depicts a control response in the control method of FIG. 6.

FIG. 7 illustratively depicts subsequent parametric values from the storage device controller 152 during time intervals 9-16, compared against the previously derived expected values for mean and variance. The container controller 156 can be programmed to recalculate the observed mean and variance if the parametric value distribution trends away from varying symmetrically around the established mean. For example, in these illustrative embodiments the container controller 156 can be programmed to recalculate the mean and variance values if a predetermined number (in this example six) of parametric values are all either above or below the mean value.

Figure 8:
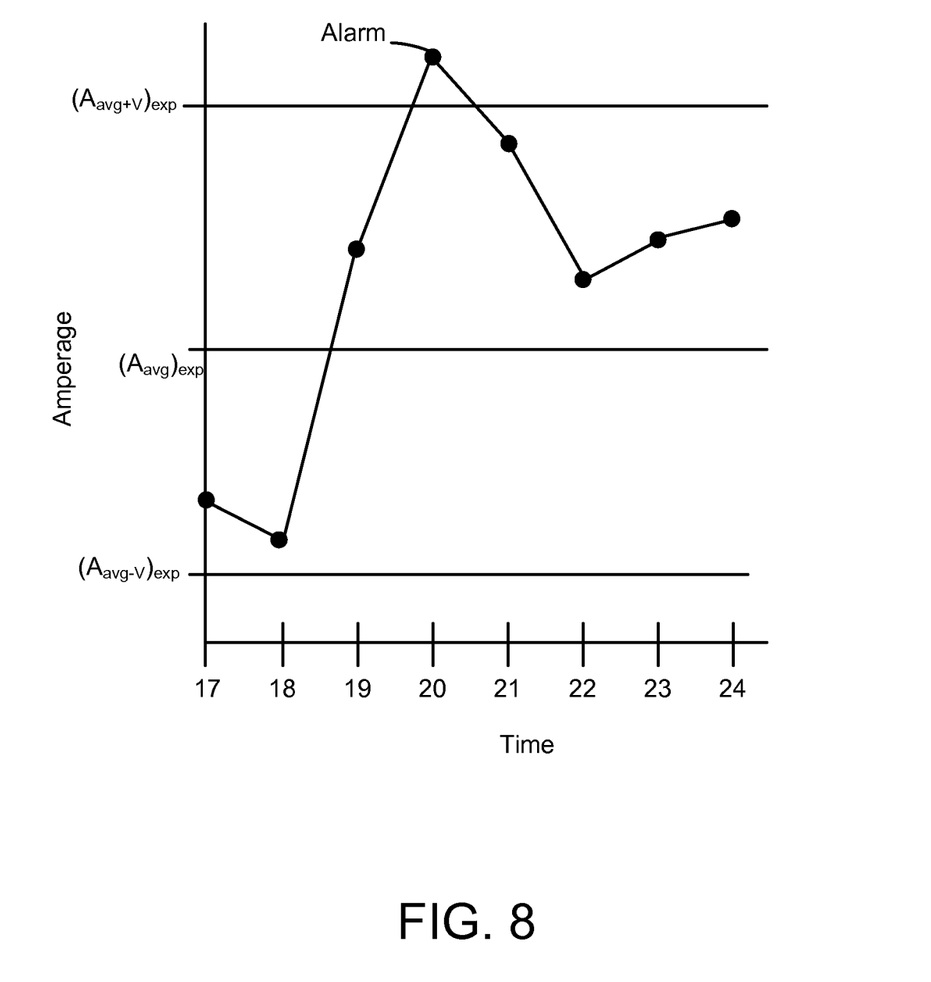
FIG. 8 graphically depicts a control response in the control method of FIG. 6.

FIG. 8 depicts the result of further parametric values from the storage device controller 152 during time intervals 17-24. At time interval 20 the parametric value exceeds the expected variance. This is an indication that some new source of process variation exists. For example, it might indicate a leak is occurring in the container 150 or the storage device diffusion path 140 (FIG. 2) might be blocked. Preferably in any event such as this, where the actual variance exceeds the established variance, the container controller 156 signals an alarm to notify personnel of the opportunity to investigate and resolve the root cause of any such unexpected process variation.

Figure 9:
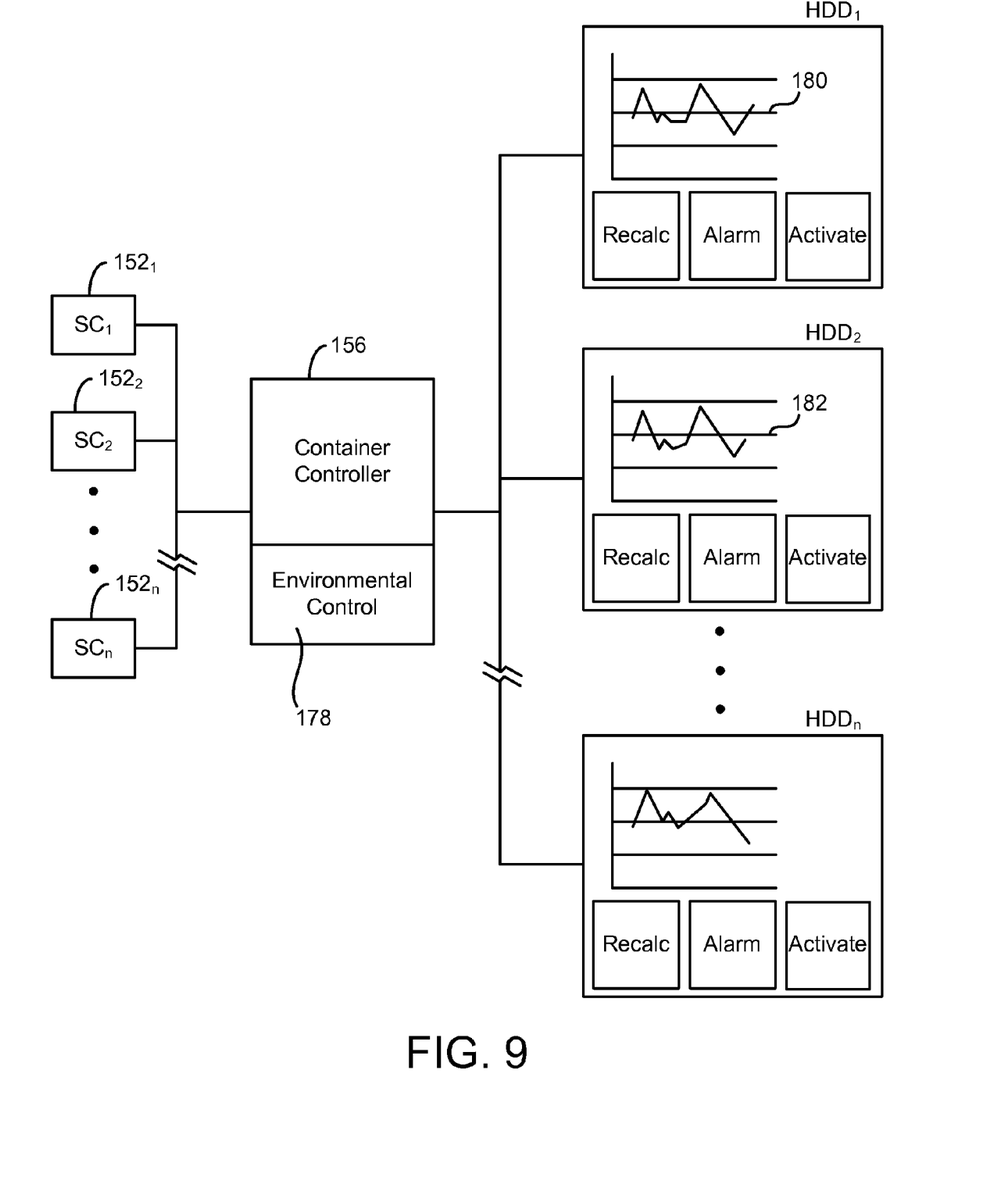
FIG. 9 is a functional block depiction of the system of FIG. 4.

FIG. 9 illustratively depicts the container controller 156 includes a computer memory to which executable computer instructions are stored that form environmental control logic 178 for carrying out the computer processes described herein. The container controller 156, by its environmental control logic 178, receives parametric values from each of the storage device controllers $152_1$, $152_2$, ... $152_n$. The container controller 156 can be programmed to monitor the parametric values individually as depicted by the plurality of individual charts that are calculated and as such drive the response of the container controller 156 with respect to any one of the storage device controllers 152. That is, the mean 180 for $HDD_1$ is likely different than the mean 182 calculated for $HDD_2$.

Further, the container controller 156 can be programmed to respond to new parametric values by recalculating the empirical mean and variance for $HDD_1$ without altering the charting or in any way disrupting the operational control of the rest of the HDDs. Further, the container controller 156 is programmed to signal an alarm for any one of the HDDs, based on the parametric value charting, without alarming or otherwise disrupting the operational control of the rest of the HDDs. Furthermore, if an alarm condition cannot be cleared in a set period of time, or based on other rules specifically designed for a particular application, the container controller 156 can be programmed to derate or even shut down one of the HDDs without disrupting the operational control of the rest of the HDDs.

The individual monitoring of each HDD provides the most granular control possible for ultimately deciding whether to activate the environment modifier 154. The analysis of the container controller 156 provides closed-loop feedback based on the lowest denominator of the observed operational performance of each and every individual HDD 100 in the container 150. This technology does not rely of the assumption of previously attempted solutions that each HDD 100 might somehow be operating identically, such that the condition of the operating environment in the container 150 outside the HDDs 100 is approximated as being the same environment inside each HDD 100.

If from this environmental control it is determined that an HDD 100 needs to be replaced, the container 152 can be equipped with an access door. When the access door is opened, then the operating environment inside the container 150 is dispersed into the ambient environment. Preferably a maximum allowable open time is determined according to what time it should take to replace one of the HDDs 100 in the container 150. The diffusion path 140 (FIG. 2) in each HDD 100 can be sized so that enough inert gas remains inside each HDD 100 until the access door can be reclosed and the environment modifier 154 activated to return the operating environment to the desired concentration. As the concentration of inert gas outside each HDD 100 increases, the steady state environment will diffuse back into each of the HDDs 100 with time. Alternatively, a newly added HDD 100 can be prefilled with helium so that enhanced performance is immediately realized, such that the operating environment maintains the environment inside the new HDD 100 instead of establishing it.

Figure 10:
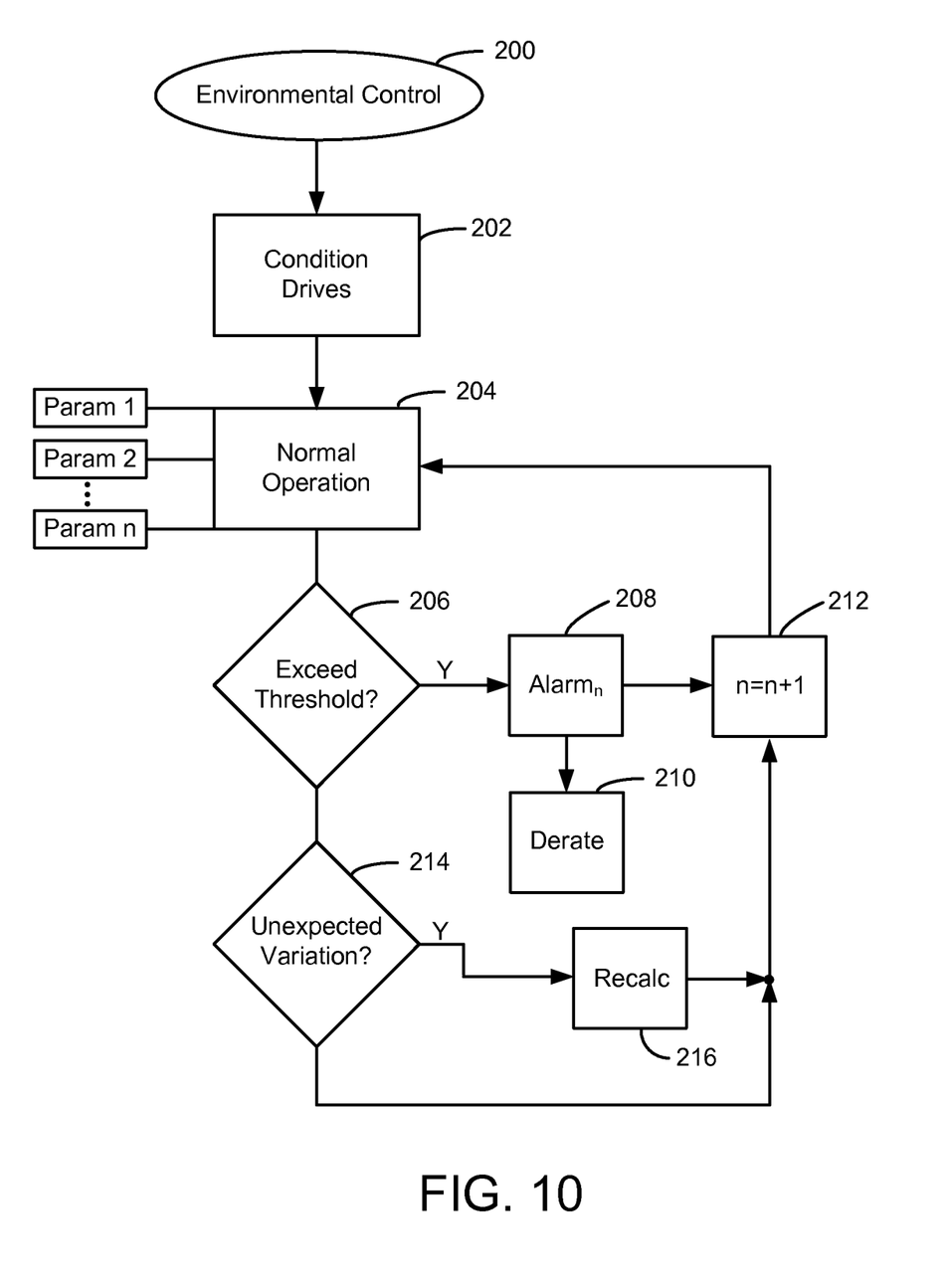
FIG. 10 is a flowchart depicting steps in a method for ENVIRONMENTAL CONTROL in accordance with this technology.

FIG. 10 is a flowchart depicting illustrative steps in a method 200 for ENVIRONMENTAL CONTROL that is performed by executing the environment control logic 178. The method 200 begins in block 202 where the HDDs in the container are conditioned so that steady state environment conditions exist in all the HDDs and in the operating environment inside the container. As described above, that can require operating the HDDs for a time until the higher inert gas composition in the container diffuses into the HDDs. As mentioned, the use of prefilled HDDs can eliminate the need for conditioning the HDDs. After stead-state conditions are observed, parametric readings from each of the storage device controllers begin in block 204. In block 206 it is determined whether any of the parametric values indicate that a predetermined threshold has been exceeded, such as a parametric value beyond the expected variance or beyond a predetermined hard limit. If the determination of block 206 is "yes," then control passes to block 208 which sends an alarm for identifying a need for root cause resolution. Rules can be established that alter the operations of the respective HDD in block 210 if an alarm condition persists too long or if the magnitude of the observed variance is severe. For example, the HDD can be derated or even shut down if that is prudent given the nature and severity of the alarm condition. In block 212 a counter is incremented and the next HDD is analyzed in the same way as control returns to block 204.

If the determination of block 206 is "no," then control passes to block 214 where it is determined whether the parametric variation is different than expected. For example, as discussed, a predetermined number of parametric values all on one side or the other of the mean indicates unexpected variation. If the determination of block 214 is "yes," then control passes to block 216 where the mean and variance are recalculated. Control then passes to block 204 for analyzing the next HDD.

The illustrative embodiments have been explained in accordance with elementary and straightforward statistical analyses in which population mean and variance is baselined and monitored. The contemplated embodiments are not so limited. In alternative embodiments more complex analytics such as employing machine learning techniques on the parametric values can predict performance by sophisticated computer modeling. Machine learning, for example, opens opportunities for analyzing the effects of interrelated parametric values. For example, machine learning modeling can be employed to analyze the trade-offs between performance, power, and reliability, with the user capable of controlling a parametric value in relation to requirements. The skilled artisan knows the details of these alternative statistical analyses, such that a detailed explanation is not necessary for the skilled artisan to understand the scope of the claimed invention. The illustrative embodiments depicted in FIG. 10 describe a serial analysis of each HDD 100. Alternatively, more sophisticated analyses such as the machine learning can be employed to analyze the population of parametric values simultaneously.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention. In addition, although the illustrative embodiments described herein include HDDs, it will be appreciated by those skilled in the art that the claimed subject matter is not so limited and environmental control in accordance with this technology can be achieved in various other devices without departing from the spirit and scope of the claimed technology.

What is claimed is:

1. An apparatus comprising:
  a sealed container operably enclosing a storage device in an operating environment;
  an environment modifier operably coupled to the container and configured to selectively alter the operating environment; and
  a non-transitory, tangible computer readable storage medium having executable computer instructions defining environmental control logic that is configured to monitor at least one operational parametric value of the storage device selected from the group of: amperage draw of a spindle motor, temperature in the operating environment, fly height of a head, and bit error rate and compare the parametric values to a threshold to determine a concentration of gas in the storage device, and to selectively activate the environment modifier based on a relation of the monitored at least one operational parametric value to the threshold.

2. The apparatus of claim 1 wherein the monitored at least one operational parametric value is the amperage draw in the operating environment.

3. The apparatus of claim 1 wherein the monitored at least one operational parametric value is the temperature in the operating environment.

4. The apparatus of claim 1 wherein a container controller of the sealed container is configured to model the at least one operational parametric value by machine learning analytics.

5. The apparatus of claim 4 wherein the container controller is configured to compare the at least one operational parametric value from the storage device controller to a predetermined threshold value.

6. The apparatus of claim 4 wherein the container controller is configured to calculate a mean value of a plurality of parametric values of the group of operational parametric values from the storage device controller.

7. The apparatus of claim 6 wherein the container controller is configured to compare the mean value to a predetermined mean threshold value.

8. The apparatus of claim 6 wherein the container controller is configured to calculate a variance of the plurality of parametric values of the group of operational parametric values from the storage device controller.

9. The apparatus of claim 8 wherein the container controller is configured to compare the variance to a predetermined variance threshold value.

10. The apparatus of claim 8 wherein the container controller is configured to recalculate the mean and variance values.

11. The apparatus of claim 8 wherein the container controller is configured to recalculate the mean and variance values when a predetermined number of consecutive parametric values of the group of operational parametric values from the storage device controller are all greater than or all less than the mean value.

12. The apparatus of claim 8 wherein the container controller is configured to signal an alarm condition if a parametric value of the group of operational parametric values from the storage device controller is not within the variance.

13. The apparatus of claim 12 wherein the storage device is a first storage device and the storage device controller is a first storage device controller, comprising a second storage device operably enclosed in the containerized operating environment and a second storage device controller operably coupled to the second storage device and configured to monitor at least one of the group of operational parametric values of the second storage device.

14. The apparatus of claim 13 wherein the container controller is configured to selectively activate the environment modifier in response to population means and variances, and to individually control and alarm the storage devices based on individual performance of at least one of the first and second storage devices in comparison to population modeling.

15. The apparatus of claim 13 wherein the container controller is configured to selectively activate the environment modifier in response to individual storage device means and variances and to individually alarm and control the storage devices based on individual performance of at least one of the first and second storage devices compared to respective empirically derived thresholds.

16. The apparatus of claim 13 wherein the container controller is configured to alter operation of one of the storage devices in response to the monitored at least one operational parametric value without altering operation of the other data storage device.

17. The apparatus of claim 1 wherein the environmental control logic is configured to individually monitor the at least one parametric value for each of a plurality of storage devices and to selectively activate the environment modifier based on a relation of the monitored at least one operational parametric value to the threshold for the respective storage devices of the plurality of storage devices.

18. The apparatus of claim 17 wherein the environmental control logic is configured to alter operation of one of the storage devices of the plurality of storage devices based on the relation of monitored at least one operational parametric value to the individual threshold of the respective storage device without altering operation of another one of the storage devices.

19. A method comprising:
    obtaining an environmental control device having a sealed container defining a cavity and an environment modifier configured to change an environment in the cavity;
    simultaneously operating a plurality of storage devices inside the container;
    monitoring at least one operational parametric values of the storage devices selected from the group of: amperage draw of a spindle motor, temperature in the operating environment, concentration of gas, fly height of a head, and bit error rate;
    comparing the at least one operational parametric value to one or more thresholds to determine a concentration of gas in at least one storage device of the plurality of storage devices; and
    selectively activating the environment modifier based on the comparing step.

* * * * *